(12) United States Patent
Hirano

(10) Patent No.: US 10,268,560 B2
(45) Date of Patent: Apr. 23, 2019

(54) BUS CONNECTION TARGET DEVICE, STORAGE CONTROL DEVICE AND BUS COMMUNICATION SYSTEM

(71) Applicant: FUJITSU LIMITED, Kawasaki-shi, Kanagawa (JP)

(72) Inventor: Yuki Hirano, Kanazawa (JP)

(73) Assignee: FUJITSU LIMITED, Kawasaki (JP)

( * ) Notice: Subject to any disclaimer, the term of this patent is extended or adjusted under 35 U.S.C. 154(b) by 248 days.

(21) Appl. No.: 15/092,658

(22) Filed: Apr. 7, 2016

(65) Prior Publication Data

US 2016/0321155 A1    Nov. 3, 2016

(30) Foreign Application Priority Data

Apr. 30, 2015    (JP) .................. 2015-093426

(51) Int. Cl.

| G06F 11/30 | (2006.01) |
|---|---|
| G06F 13/40 | (2006.01) |
| G06F 11/32 | (2006.01) |
| G06F 13/42 | (2006.01) |
| G06F 11/22 | (2006.01) |

(52) U.S. Cl.
CPC ........ G06F 11/327 (2013.01); G06F 11/2289 (2013.01); G06F 11/3027 (2013.01); G06F 11/3034 (2013.01); G06F 11/3051 (2013.01); G06F 13/4022 (2013.01); G06F 13/4282 (2013.01)

(58) Field of Classification Search
None
See application file for complete search history.

(56) References Cited

U.S. PATENT DOCUMENTS

| 7,487,281 B2* | 2/2009 | Okamoto ............ G06F 13/1668 710/107 |
|---|---|---|
| 2005/0228943 A1* | 10/2005 | DeCenzo ............ G06F 11/1076 711/114 |
| 2008/0046603 A1* | 2/2008 | Kobayashi ............ G06F 11/364 710/17 |
| 2008/0276033 A1 | 11/2008 | DeCenzo et al. |
| 2014/0032965 A1* | 1/2014 | Tsukamoto ......... G06F 11/3024 714/30 |

(Continued)

FOREIGN PATENT DOCUMENTS

| JP | 11-191073 | 7/1999 |
|---|---|---|
| JP | 11-331374 A | 11/1999 |

(Continued)

OTHER PUBLICATIONS

Japanese Office Action dated Sep. 11, 2018 for corresponding Japanese Patent Application No. 2015-093426, with Partial English Translation, 6 pages.

*Primary Examiner* — Michael Sun
(74) *Attorney, Agent, or Firm* — Fujitsu Patent Center

(57) ABSTRACT

The present invention includes an abnormality detector which detects abnormality which is being transferred and issues an error notification to a connection monitor, and a disconnection processor which, when receiving the error notification, disconnects connection made via a bus switch, so that it is possible to prevent propagation of abnormality when abnormality is detected in data which is being transferred.

6 Claims, 10 Drawing Sheets

(56) References Cited

U.S. PATENT DOCUMENTS

| | | | |
|---|---|---|---|
| 2014/0164671 A1* | 6/2014 | Chiu | G06F 13/4022 710/316 |
| 2015/0317272 A1* | 11/2015 | Tanaka | G06F 13/385 710/301 |
| 2017/0192474 A1* | 7/2017 | Robinson | G06F 1/263 |

FOREIGN PATENT DOCUMENTS

| | | |
|---|---|---|
| JP | 2005-293595 | 10/2005 |
| JP | 2006-146685 A | 6/2006 |
| WO | 2014/115257 A1 | 7/2014 |

* cited by examiner

BUS CONNECTION TARGET DEVICE, STORAGE CONTROL DEVICE AND BUS COMMUNICATION SYSTEM

CROSS-REFERENCE TO RELATED APPLICATION

This application is based upon and claims the benefit of priority of the prior Japanese Patent application No. 2015-093426, filed on Apr. 30, 2015, the entire contents of which are incorporated herein by reference.

FIELD

The embodiment discussed herein is directed to a bus connection target device, a storage control device and a bus communication system.

BACKGROUND

A RAID (Redundant Arrays of Inexpensive Disks) device which has a plurality of controller modules (each abbreviated as a CM below), and in which these CMs are connected with each other via front-end routers (each referred to as an FRT below) and via PCIe (Peripheral Component Interconnect Express) buses (each referred to as a PCIe bus below) is known.

Multiple items of user data flow in paths connecting the CMs to keep data redundancy. If user data is garbled and propagates to another CM due to a factor such as abnormality inside an LSI (Large Scale Integration) device, normal data is lost and redundancy cannot be kept, and therefore there is a concern that a system down occurs.

FIG. 10 is a view illustrating a process when abnormality is detected in a PCIe switch in the conventional RAID device. In an example illustrated in FIG. 10, a RAID device 100 includes four CMs 200, two service controllers (each referred to as an SVC) 300 and four FRTs 400.

Each CM 200 includes a monitoring FPGA (Field Programmable Gate Array) 201, a CPU 202 and a PCIe switch 203.

The PCIe switch 203 includes a port 2031 and an NTB (Non Transparent Bridge) port 2032. The port 2031 relays data received by the PCIe switch 203 to transfer to an external device. Further, each port 2031 includes a register which stores detected error factor and configuration information which is necessary to transfer data.

The PCIe switch 203 is connected with the CPU 202 via the port 2031. The CPU 202 performs various types of control on the CM 200, and corresponds to a route complex of a PCIe.

Further, the PCIe switch 203 is connected with a PCIe switch 401 of the FRT 400 via the NTB port 2032.

The NTB port 2032 converts a domain (address) of data to transmit, into a domain supported by the other party in order to transfer data between the CMs 200. In addition, the NTB port 2032 also includes the same register as that of the above port 2031.

Each monitoring FPGA 201 includes an inter-FPGA communication control block 2011 and an error detection logic 2012. The error detection logic 2012 receives an input of an error notification signal from the PCIe switch 401 of each FRT 400.

The inter-FPGA communication control block 2011 is connected with an inter-FPGA communication control block 3011 of a monitoring FPGA 301 of each SVC 300 via an inter-FPGA communication data bus.

In this way, the monitoring FPGA 301 of each SVC 300 is connected with the monitoring FPGAs (monitoring devices) 201 of all CMs 200 via the inter-FPGA communication data buses. Further, a data bus from each CM 200 is branched into and connected with the two SVCs 300 to configure a redundant bus.

Each SVC 300 includes the monitoring FPGA 301. Each monitoring FPGA 301 includes the inter-FPGA communication control block 3011 and a power-off control function 3012. The power-off control function 3012 notifies the PCIe switch 401 of the specified FRT 400 of a power off request to perform control to power off this PCIe switch 401.

Each FRT 400 includes the PCIe switch 401. Each PCIe switch 401 includes a plurality of ports 4011, and each CM 200 is connected to each port 4011.

Each port 4011 of the PCIe switch 401 also has the same function and configuration as those of the port 2031 of each PCIe switch 203, and relays data received by the PCIe switch 401 to transfer to an external device.

The PCIe switch 401 includes a plurality of ports 4011. In this regard, only one port 4011 is illustrated in FIG. 10 for ease of illustration. Each port 4011 of the PCIe switch 401 is connected with the NTB port 2032 of the PCIe switch 203 of the CM 200 via a PCIe bus. Thus, the CMs 200 communicates with each other via the FRTs 400.

The PCIe switch 401 has a function of, when detecting abnormality which is likely to cause uncorrectable data garbling (so-called 2-bit garbling) such as a PCIe uncorrectable error, notifying an external device of this abnormality by outputting an error notification signal. This error notification signal is input to all CMs 200.

In addition, it is possible to mount on this PCIe switch 401 the same NTB port as the NTB port 2032 of the above PCIe switch 203 yet there is a system limitation that only one NTB port can be mounted. Therefore, it is not possible to allocate NTB ports to all ports of the PCIe switches 401 connected with the PCIe buses.

A process in case where the PCIe switch 401 of the FRT 400 detects abnormality in the conventional RAID device configured as described above will be described.

When the PCIe switch 401 detects abnormality (see a reference numeral A1 in FIG. 10), the PCIe switch 401 notifies the monitoring FPGAs 201 of all CMs 200 of that the abnormality has been detected by issuing error notification signals (a reference numeral A2 in FIG. 10).

Each monitoring FPGA 201 which has received the error notification signal specifies a transmission source of the error notification signal as an error factor according to the error detection logic 2012. Each monitoring FPGA 201 notifies the monitoring FPGA 301 of the SVC 300 of a power off request of the error factor PCIe switch 401 by using an inter-FPGA communication data signal (see a reference numeral A3 in FIG. 10).

The monitoring FPGA 301 of the SVC 300 which has received the error notification signal issues operating power supply off control to the specified FRT 400 (see a reference numeral A4 in FIG. 10).

An operating power supply of the FRT 400 for which the operating power supply off control has been issued is powered off, and PCIe bus communication with the CM 200 is disconnected (see a reference numeral A5 in FIG. 10). Thus, the FRT 400 is separated from all CMs 200 (see a reference numeral A6 in FIG. 10).

Patent Literature 1: Japanese Patent Application Laid-Open No. 2005-293595

Patent Literature 2: Japanese Patent Application Laid-Open No. 11-191073

However, in such a conventional RAID device, in case where data is transferred from the specific CM 200 to the FRT 400, and when abnormality which causes data garbling inside the PCIe switch 203 of the CM 200 occurs, the PCIe switch 401 of the FRT 400 which receives this data detects an error.

The PCIe switch 401 which has detected the error issues an error notification signal to an external device. As described above, the monitoring FPGA 301 of the SVC 300 which has received the error notification signal issues operating power supply off control to the specified FRT 400, and the operating power supply of the FRT 400 for which the operating power supply off control has been issued is power off and is separated from all CMs 200.

Fundamentally speaking, it is desirable to minimize an influence caused by error detection by separating only the CM 200 in which abnormality has occurred. However, the above conventional RAID device has a problem that the influence eventually spreads to all CMs 200 connected with the FRT 400 including the PCIe switch 401.

SUMMARY

According to an aspect of the embodiment, this communication system includes: a control device that includes a first bus switch; a communication device that includes a second switch connected with the first bus switch and is connected with the control device; and a management device that manages communication between the control device and the communication device, wherein the communication device includes an abnormality detector that detects, in the second bus switch, abnormality of data that is being transferred, and issues an error notification to the management device, the management device includes a disconnection request processor that, when receiving the error notification, issues to the control device a disconnection request for disconnecting the connection with the first bus switch, and the control device includes a disconnection processor that disconnects the connection between the first bus switch and the second switch in response to the disconnection request from the disconnection request processor.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT

A bus connection target device, a storage control device and a bus communication system according to an embodiment will be described below with reference to the drawings. In this regard, the following embodiment is only an exemplary embodiment, and does not intend to exclude application of various modified examples and techniques which are not described in the embodiment. That is, the present embodiment can be carried out by being variously modified or combining each modified examples without departing from the spirit of the invention. Further, each drawing does not intend that only components illustrated in each drawing are provided and may include other functions.

(A) Configuration

Figure 1:
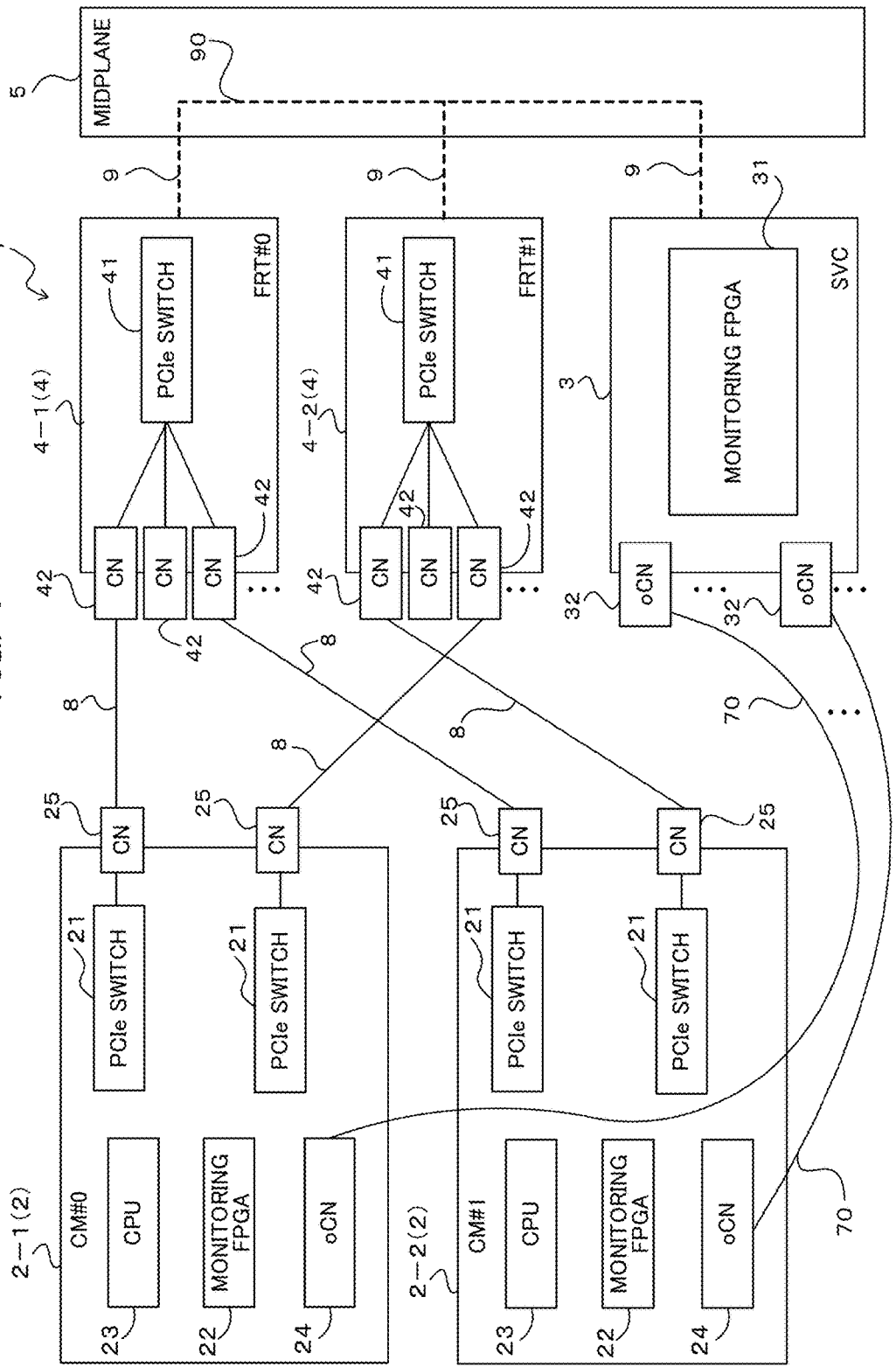
FIG. 1 is a view illustrating a cable connection configuration of a storage device according to one embodiment.
Figure 2:
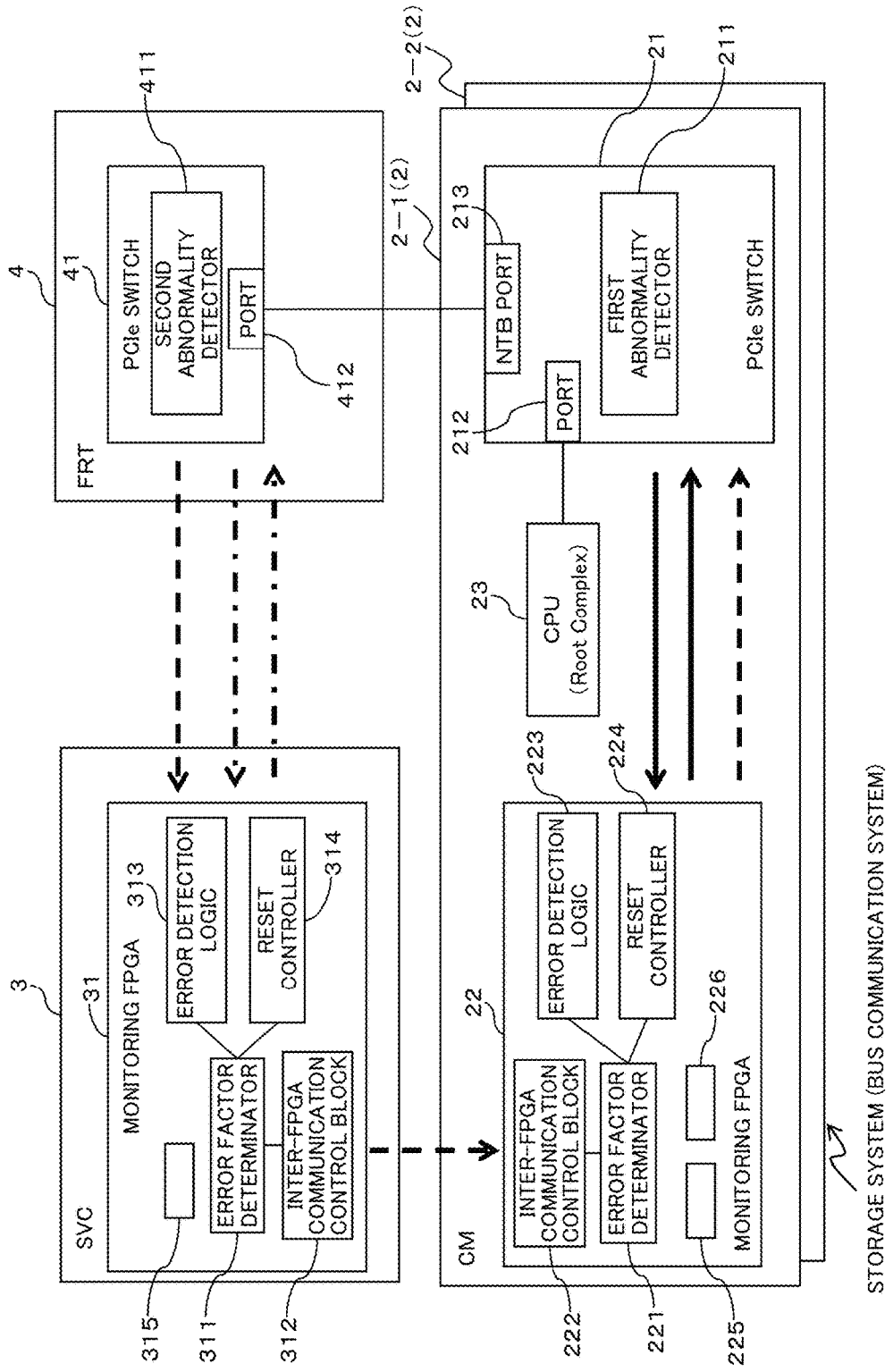
FIG. 2 is a view illustrating a functional configuration of the storage device according to one embodiment.

FIG. 1 is a view illustrating a cable connection configuration of a storage device 1 according to one embodiment, and FIG. 2 is a view illustrating a function configuration of the storage device 1.

In an example illustrated in this FIG. 1, the storage device 1 includes an SVC 3, a midplane 5, a plurality of (two are illustrated in FIG. 1) CMs 2-1 and 202 and a plurality of (two are illustrated in FIG. 1) FRTs 4-1 and 4-2.

Hereinafter, an example where a plurality of CMs 2-1 and 2-2 and the FRTs 4-1 and 4-2 are connected by communication cables 8 of a PCIe in this storage device 1 will be described.

The midplane 5 is a circuit substrate device which performs data communication between devices, and includes a plurality of connectors which is not illustrated and performs bus communication between devices connected to these connectors.

In the example illustrated in FIG. 1, the midplane 5 is connected with the SVC 3 and the two FRTs 4-1 and 4-2.

The FRTs 4-1 and 4-2 are communication devices which realize communication between a plurality of CMs 2-1 and 2-2 (communication between the CM and the CM). The FRTs 4-1 and 4-2 each employ the same configuration.

In this regard, the FRT 4-1 will be also referred to as an FRT #0 below. Similarly, the FRT 4-2 will be also referred to as an FRT #1.

Reference numerals 4-1 and 4-2 indicating the FRTs will be used when it is necessary to specify one of a plurality of FRTs, yet reference numeral 4 will be used to indicate an arbitrary FRT.

Further, reference numerals 2-1 and 2-2 indicating the CMs will be used when it is necessary to specify one of a plurality of CMs, yet reference numeral 2 will be used to indicate an arbitrary CM.

[1] FRT

The FRT 4 includes a PCIe switch 41 and a plurality of (e.g. 24) connectors 42. In addition, FIG. 1 illustrates only part of the connectors 42 of each FRT 4 for ease of description.

A connector (not illustrated) attached to one end of the PCIe communication cable (referred to simply as a communication cable below) 8 is detachably mounted on each connector 42. Further, the other end of the communication cable 8 is mounted on the connectors 25 of the CMs 2-1 and 2-2 described below.

Each FRT 4 is connected with all CMs 2 via the communication cables 8. That is, each CM 2 is connected with all FRTs 4 via the communication cables 8.

The PCIe switch 41 is a circuit device which switches a data communication path, and causes the other connector 42 or the like to output data input to the connector 42 according to a data transmission destination (communicating party).

Figure 3:
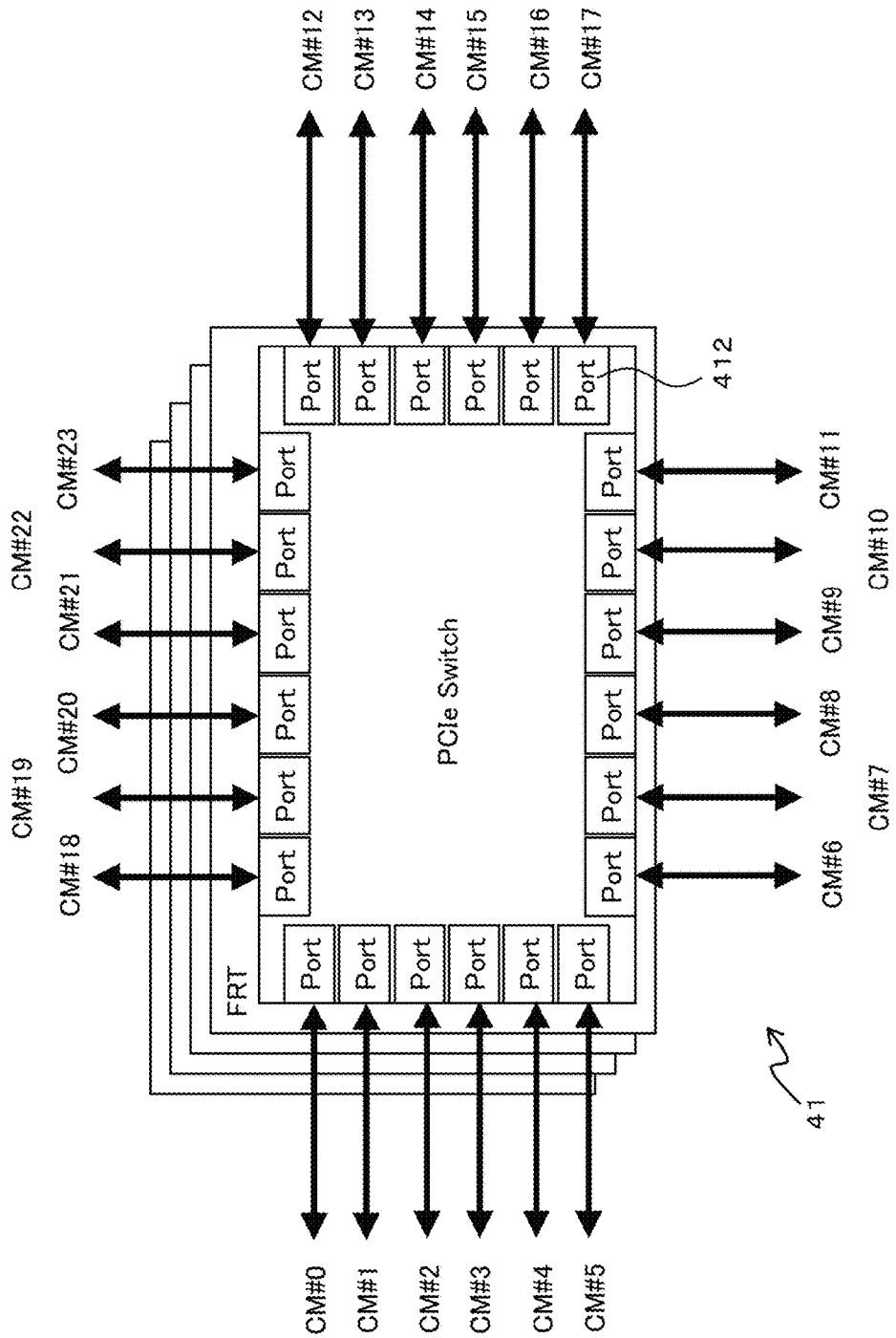
FIG. 3 is a view illustrating a bus connection state in a PCIe switch provided to an FRT of the storage device according to one embodiment.

FIG. 3 is a view illustrating a bus connection state of the PCIe switch 41 included in the FRT 4 of the storage device 1 according to one embodiment. 24 ports 412 are provided along an outer circumference of the PCIe switch 41 illustrated in FIG. 3. The connectors 42 are connected to these ports 412, respectively (not illustrated in FIG. 3), and each connector 42 is connected with the CM 2 (CM #0 to 23) via the communication cable 8.

Further, the PCIe switch 41 includes a function as a second abnormality detector 411 as illustrated in FIG. 2.

The second abnormality detector 411 detects abnormality which causes data garbling in the PCIe switch 41 when transferring data from the FRT 4 to the CM 2. In addition, such abnormality detection can be realized by a known method, and therefore will not be described.

When detecting abnormality, the second abnormality detector 411 issues an error notification signal for notifying a monitoring FPGA 31 of the SVC 3 that the abnormality has occurred.

Further, each FRT 4 is connected with the SVC 3 via data buses 9 and the midplane 5. A data communication path which connects each FRT 4 and the SVC 3 by using these data buses 9 and the midplane 5 will be referred to as a first data bus 90.

[2] CM

Each CM 2 performs various types of control on the storage device 1, and performs various types of control such as access control with respect to a storage device such as an HDD (Hard Disk Drive) which is not illustrated, according to a storage access request from a host device which is not illustrated. Further, each CM 2 employs the same configuration. Each CM 2 is stored in a controller enclosure (CE) which is not illustrated.

Each CM 2 illustrated in FIG. 1 includes a CPU 23, a connector (oCN) 24 and a monitoring FPGA 22, and includes a plurality of (four in the example illustrated in FIG. 1) connectors (CN) 25 and a PCIe switch 21.

One end of the communication cable 8 is detachably mounted on the connector 25. Further, the other end of the communication cable 8 is mounted on the connector 42 of the FRT 4. Each CM 2 is connected with all FRTs 4 via the communication cables 8.

One end of a monitoring interface cable 70 is detachably mounted on the connector 24. The other end of the monitoring interface cable 70 is mounted on a connector 32 provided to the SVC 3, and the CM 2 is connected with the SVC 3 via the monitoring interface cable 70 to be able to communicate with the SVC 3.

Each connector 25 is connected with the PCIe switch 21.

As illustrated in FIG. 2, the PCIe switch 21 includes a port 212 and an NTB (Non Transparent Bridge) port 213.

The port 212 relays data received by the PCIe switch 21 to transfer to an external device.

Further, the port 212 includes a register (not illustrated) which stores a detected error factor and configuration information which is necessary to transfer data.

The PCIe switch 21 is connected with the CPU 23 via the port 212.

Further, the PCIe switch 21 is connected with the PCIe switch 41 of the FRT 4 via the NTB port 213.

When transferring data between the CMs 2, the NTB port 213 converts a domain (address) of data to transmit, into a domain which can be supported by the other party. In addition, the NTB port 213 also includes the same register as that of the above port 212.

Further, the PCIe switch 21 receives an input of an NTB port reset signal from a reset controller 224 of the monitoring FPGA 22 described below.

In a PCIe switch including an NTB port, a chip includes a reset terminal (a port reset terminal and an NTB port reset terminal) which enables instruction of port reset in port units from an outside. The NTB port of this PCIe switch can be individually reset per port. By individually resetting the port, it is possible to recover a system while minimizing an influence without influencing communication connected via other ports.

In this system, such an NTB port is used as a port which can be individually reset. Further, an NTB port reset signal functions as an instruction signal for individually resetting an NTB port.

When receiving an input of this NTB port reset signal, the PCIe switch 21 resets the NTB port 213. Resetting the NTB port 213 will be also referred to as NTB port reset. By performing the NTB port reset, the NTB port 213 is individually reset.

In addition, the NTB port reset signal is input to the NTB port reset terminal (not illustrated) provided to the PCIe switch 21, for example. When a signal is input to this NTB port reset terminal, the PCIe switch 21 resets the NTB port 213. Meanwhile, resetting the NTB port 213 is not limited to this, and may be realized by using other various methods. For example, some signal for instructing resetting of the NTB port 213 may be input to another terminal of the PCIe switch 21. The PCIe switch 21 resets the NTB port 213 when receiving this signal.

When the PCIe switch 21 resets the NTB port 213, a PCIe bus which connects the NTB port 213 of the PCIe switch 21 and the FRT 4 is disconnected.

When abnormality occurs in a PCIe bus system as a result that a PCIe bus connected with an NTB port is connected at an unexpected bus rate or with an unexpected number, NTB port reset is used as a method of reconstructing (recovering) a PCIe bus state. By performing NTB port reset on the PCIe switch 21 of the CM 2, the storage device 1 disconnects the PCIe bus which connects the PCIe switch 21 and the FRT 4.

As described above, the PCIe bus system has a limitation that only one NTB port can be provided to the PCIe switch. Hence, it is not possible to allocate NTB ports to all ports connected with the PCIe buses of the PCIe switches 41 of the above FRTs 4. Thus, the PCIe switch 41 cannot have a plurality of NTB ports, and therefore the PCIe switch 41 does not use an NTB port reset function.

Further, as illustrated in FIG. 2, the PCIe switch 21 has a function of a first abnormality detector 211.

The first abnormality detector (an abnormality detector and a second abnormality detector) 211 detects abnormality which causes data garbling in the PCIe switch 21 when data is transferred from the CM 2 to the FRT 4. For example, the first abnormality detector 211 detects abnormality which could cause uncorrectable data garbling (so-called 2-bit garbling) such as a PCIe uncorrectable error. In addition, such abnormality detection can be realized by a known method and therefore will not be described.

When detecting abnormality, the first abnormality detector 211 issues to the monitoring FPGA 22 an error notification signal which notifies that the abnormality has occurred.

The CPU 23 performs various types of control on the CM 2, and corresponds to a PCIe route complex.

As illustrated in FIG. 2, the monitoring FPGA 22 includes functions of an error factor determinator 221, an inter-FPGA communication control block 222, the reset controller 224, a first determining register 225, a second determining register 226 and an error detection logic 223. These functions are realized by setting and rewriting a circuit configuration to and in the monitoring FPGA 22.

The error detection logic 223 receives an input of an error notification signal from the PCIe switch 21. The error detection logic 223 detects occurrence of abnormality in the PCIe switch 21 by detecting the input of this error notification signal.

The error factor determinator 221 specifies an error factor based on an error notification signal input from an outside (e.g. PCIe switch 21). For example, the error factor determinator 221 determines that a transmission source of the error notification signal is an error factor. Further, when an error notification signal includes information indicating an error factor, the error factor determinator 221 reads information indicating the error factor from the error notification signal, and specifies the error factor based on this information.

Hence, when the monitoring FPGA 22 receives the input of the error notification signal from the PCIe switch 21, the error factor determinator 221 determines that the PCIe switch 21 is an error factor.

Further, the error factor determinator 221 instructs (NTB port reset instruction) the reset controller 224 to reset the NTB port 213 of the PCIe switch 21 which is the specified error factor.

That is, the error factor determinator 221 instructs (NTB port reset instruction) the reset controller 224 to reset the NTB port 213 of the PCIe switch 21 when receiving the error notification signal from the PCIe switch 21.

Further, when receiving a request (NTB port reset request) for resetting the NTB port 213 of the PCIe switch 21, from the monitoring FPGA 31 of the SVC 3 described below, too, the error factor determinator 221 instructs (NTB port reset instruction) the reset controller 224 to reset the NTB port 213 of the PCIe switch 21.

By this means, the error factor determinator 221 and the reset controller 224 described below function as disconnection processors (third disconnection processors) which disconnect connection made via the PCIe switch 41 or the PCIe switch 21 which has detected abnormality.

A setting value indicating whether or not to enable a function of the error factor determinator 221 of issuing an NTB port reset instruction of the NTB port 213 as described above when receiving an error notification signal from the PCIe switch 21 is stored in the first determining register 225.

The error factor determinator 221 performs a process corresponding to a value set to this first determining register 225.

When, for example, "1" is set to this first determining register 225, and when an error notification signal is received from the PCIe switch 21, the error factor determinator 221 issues to the reset controller 224 an NTB port reset instruction for resetting the NTB port 213 of the PCIe switch 21. The reset controller 224 which has received an NTB port reset instruction resets (NIB port reset) the NTB port 213 by issuing an NTB port reset signal to the PCIe switch 21 as described below.

Meanwhile, when "0" is set to this first determining register 225, even though an error notification signal is received from the PCIe switch 21, the error factor determinator 221 does not issue an NTB port reset instruction for resetting the NTB port 213 of the PCIe switch 21. That is, the error factor determinator 221 disables a function of resetting the NTB port 213 of the PCIe switch 21.

A setting value indicating whether or not to enable a function of the error factor determinator 221 of issuing an NTB port reset instruction of the NTB port 213 as described above when an NTB port reset request for resetting the NTB port 213 of the PCIe switch 21 is received from the monitoring FPGA 31 of the SVC 3 described below is stored in the second determining register 226.

The error factor determinator 221 performs a process corresponding to a value set to this second determining register 226.

When, for example, "1" is set to this second determining register 226, and when an NTB port reset request is received from the monitoring FPGA 31 of the SVC 3, the error factor determinator 221 issues to the reset controller 224 an NTB port reset instruction for resetting the NTB port 213 of the PCIe switch 21.

Meanwhile, when "0" is set to this second determining register 226, even though an NTB port reset request is received from the monitoring FPGA 31 of the SVC 3, the error factor determinator 221 does not issue an NTB port reset instruction to the reset controller 224. That is, the error factor determinator 221 disables a function (process) of resetting the NTB port 213 of the PCIe switch 21.

In addition, one value of "0" and "1" is set in advance as a default value to each value of the first determining register 225 and the second determining register 226, and the user can change this default value at random.

The inter-FPGA communication control block 222 performs inter-FPGA data communication with an inter-FPGA communication control block 312 of the SVC 3. For example, the inter-FPGA communication control block 222 receives an NTB port reset instruction transmitted from the inter-FPGA communication control block 312 of the monitoring FPGA 31 of the SVC 3.

The reset controller 224 performs control to reset the NTB port 213 of the PCIe switch 21.

When receiving an NTB port reset instruction from the error factor determinator 221, the reset controller 224 issues to the PCIe switch 21 an NTB port reset signal for resetting the NTB port 213 of the PCIe switch 21.

When receiving an input of this NTB port reset signal, the PCIe switch 21 resets the NTB port 213. In addition, the NTB port reset signal may be input to, for example, an NTB port reset terminal (not illustrated) provided to the PCIe switch 21. When the signal is input to this NTB port reset terminal, the PCIe switch 21 resets the NTB port 213. In this regard, resetting the NTB port 213 is not limited to this and may be realized by various other methods.

When the NTB port 213 is reset in the PCIe switch 21, the PCIe bus which connects the PCIe switch 21 and the FRT 4 is disconnected.

Hence, in the CM 2, the error factor determinator 221 and the reset controller 224 function as disconnector processors which disconnect the connection between the PCIe switch 21 and the PCIe switch 41 according to a disconnection request (NTB port reset) from the monitoring FPGA 31 of the SVC 3.

[3] SVC

The SVC 3 is a monitoring device which performs various types of monitoring in this storage device 1, and, for example, the SVC 3 communicates with each CM 2, collects error state information and accumulates error logs. The SVC 3 also functions as a management device which manages communication between the CMs 2 and the FRTs 4.

As illustrated in FIG. 1, the SVC 3 includes the monitoring FPGA 31 and a plurality of (two in the example illustrated in FIG. 1) connectors (oCN) 32. One end of the monitoring interface cable 70 is mounted on each connector 32. The other end of the monitoring interface cable 70 is mounted on each connector (oCN) 24 provided to the CM 2, so that the SVC 3 is connected with each CM 2 via each monitoring interface cable 70 to be able to communicate with each CM 2 and monitors these CMs 2.

In the example illustrated in FIG. 1, the two CMs 2 and the two connectors 32 are illustrated for ease of description yet three or more (e.g. 24) CMs 2 and connectors 32 may be provided and various modifications can be carried out.

The monitoring FPGA 31 is an integrated circuit whose circuit configuration is rewritable. As illustrated in FIG. 2, this monitoring FPGA 31 includes functions of an error factor determinator 311, the inter-FPGA communication control block 312, a reset controller 314, a third determining register 315 and an error detection logic 313. These functions can be realized by setting and rewriting the circuit configuration of the monitoring FPGA 31.

The error detection logic 313 receives an input of an error notification signal from an outside (e.g. FRT 4). The error detection logic 313 detects occurrence of abnormality by detecting the input of this error notification signal.

The error factor determinator 311 specifies an error factor based on the error notification signal input from an outside (e.g. FRT 4). For example, the error factor determinator 311 specifies a transmission source of the error notification signal as an error factor. Further, when an error notification signal includes information indicating an error factor, the error factor determinator 311 reads the information indicating the error factor, from the error notification signal, and specifies the error factor based on this information.

Furthermore, when receiving an input of an error notification signal, the error factor determinator 311 performs a process in one of (1) a first error process mode and (2) a second error process mode described below.

(1) First Error Process Mode

In case where abnormality which causes data garbling is detected in the PCIe switch 41 of the FRT 4 after data is normally transferred from the CM 2 to the FRT 4, the detection of the abnormality triggers port reset of the NTB port 213 with respect to the PCIe switches 21 of all CMs 2 connected with the PCIe switch 41.

In the first error process mode, the error factor determinator 311 notifies, via the inter-FPGA communication control block 312, the monitoring FPGA 22 of the CM 2 of an instruction (NTB port reset instruction) for resetting the NTB port 213 of the PCIe switch 21 used for connection with the specified error factor.

In an example illustrated in FIG. 2, the PCIe switch 41 is, for example, an error factor. In the first error process mode, the error factor determinator 311 transmits to the monitoring FPGA 22 of this CM 2 an NTB port reset instruction for causing the CM 2 to reset the NTB port 213 of the PCIe switch 21 used for connection with the PCIe switch 41.

According to this NTB port reset instruction, the monitoring FPGA 22 issues the NTB port reset signal to the PCIe switch 21 and resets the NTB port 213. By resetting the NTB port 213 in each CM 2 connected with the FRT 4, all PCIe buses connected with the FRT 4 are disconnected. Consequently, it is possible to block a communication path which passes through the FRT 4 which has detected abnormality, and prevent data garbling from propagating to all CMs 2.

That is, the error factor determinator 311 functions as a disconnection request processor which, when receiving an error notification signal from the FRT 4, issues to the CM 2 a disconnection request (NTB port reset request) for disconnecting connection with the PCIe switch 21.

(2) Second Error Process Mode

In the above first error process mode, when the second abnormality detector 411 detects abnormality, a PCIe bus is disconnected by performing port reset on the PCIe switch 21 via the monitoring FPGA 22 of the CM 2 or the like. In this case, there is a concern that data garbling which has occurred in the PCIe switch 41 propagates because the PCIe bus is not disconnected on time.

In the second error process mode, the error factor determinator 311 performs device reset on the PCIe switch 41 of the FRT 4 which is a transmission source of an error notification signal. That is, detection of abnormality which causes data garbling in the PCIe switch 41 of the FRT 4 triggers device reset with respect to the PCIe switch 41. By performing device reset on the PCIe switch 41, all PCIe buses connected with the FRT 4 are disconnected. Consequently, it is possible to block communication paths which pass through the FRT 4 which has detected the abnormality, and quickly prevent data garbling from propagating to all CMs 2.

When the device reset is performed, the PCIe switch is reset, and all PCIe buses connected with this PCIe switch 41 are disconnected. A power supply of the FRT 4 stays in an on state.

In addition, a device reset signal issued to the PCIe switch 41 is a control signal for causing an external device to perform device reset on the PCIe switch 41. A conventional storage device does not use such device reset for a device operation.

The error factor determinator 311 performs a process by selecting one of the above first error process mode and second error process mode according to a value set to the third determining register 315.

A setting value indicating in which one of the first error process mode and the second error process mode the error factor determinator 311 performs a process when an error notification signal is received from the PCIe switch 41 is stored in the third determining register 315.

When, for example, "0" is set to the third determining register 315, the process is performed in the first error process mode. That is, when receiving an error notification signal from the PCIe switch 41 of the FRT 4, the error factor determinator 311 notifies the monitoring FPGA 22 of each CM 2 of an NTB port reset request for resetting the NTB port 213 of the PCIe switch 21 without issuing device reset to the PCIe switch 41 of the FRT 4.

Meanwhile, when "1" is set to the third determining register 315, a process is performed in the second error process mode. That is, when receiving an error notification signal from the PCIe switch 41 of the FRT 4, the error factor determinator 311 issues to the reset controller 314 a device reset instruction for resetting the PCIe switch 41 of the FRT 4.

The reset controller 314 which has received this device reset instruction issues device reset to the PCIe switch 41 of the FRT 4 which is a transmission source of the error notification signal. In addition, an NTB port reset for resetting the NTB port 213 of the PCIe switch 21 is not notified to the monitoring FPGA 22 of each CM 2.

The inter-FPGA communication control block 312 performs inter-FPGA data communication with the inter-FPGA communication control block 222 of the CM 2. For example, the inter-FPGA communication control block 312 transmits the NTB port reset instruction to the inter-FPGA communication control block 222 of the monitoring FPGA 22 of the CM 2.

The reset controller 314 issues device reset to the PCIe switch 41 of the FRT 4. This reset controller 314 receives an input of the device reset instruction from the error factor determinator 311. The reset controller 314 which has received this device reset instruction issues the device reset to the PCIe switch 41 of the FRT 4.

When the PCIe switch 41 of the FRT 4 is subjected to the device reset, all PCIe buses connected with this FRT 4 are disconnected. Thus, all PCIe buses connected with the FRT 4 for which this device reset has been issued are disconnected.

That is, it is possible to block communication paths which pass through the FRT 4 which has detected abnormality, and more quickly prevent data garbling from propagating to all CMs 2.

Further, in the second error process mode, the error factor determinator 311 and the reset controller 314 function as disconnection processors which disconnect connection made via the PCIe switch 41 which has detected abnormality. Furthermore, in the second error process mode, these error factor determinator 311 and reset controller 314 function as second disconnection processors which, when receiving error notification signals, disconnect connection made via this PCIe switch 41 by resetting (device reset) the PCIe switch 41 of the FRT 4.

In addition, the device reset of the PCIe switch 41 can be realized by a known method and therefore this known method will not be described.

(B) Operation

A process upon occurrence of abnormality in the storage device 1 according to one embodiment configured as described above will be described.

(a) Detection of Abnormality in CM 2

First, the process in case where abnormality which causes data garbling in the PCIe switch 21 of the CM 2 when the CM 2 transfers data to the FRT 4 will be described according to a sequence diagram (steps S11 to S17) illustrated in FIG. 4 with reference to FIG. 5. FIG. 5 is a view illustrating a signal flow in case where abnormality which causes data garbling is detected in the PCIe switch 21 when the CM 2 transfers data to the FRT 4.

Figure 4:
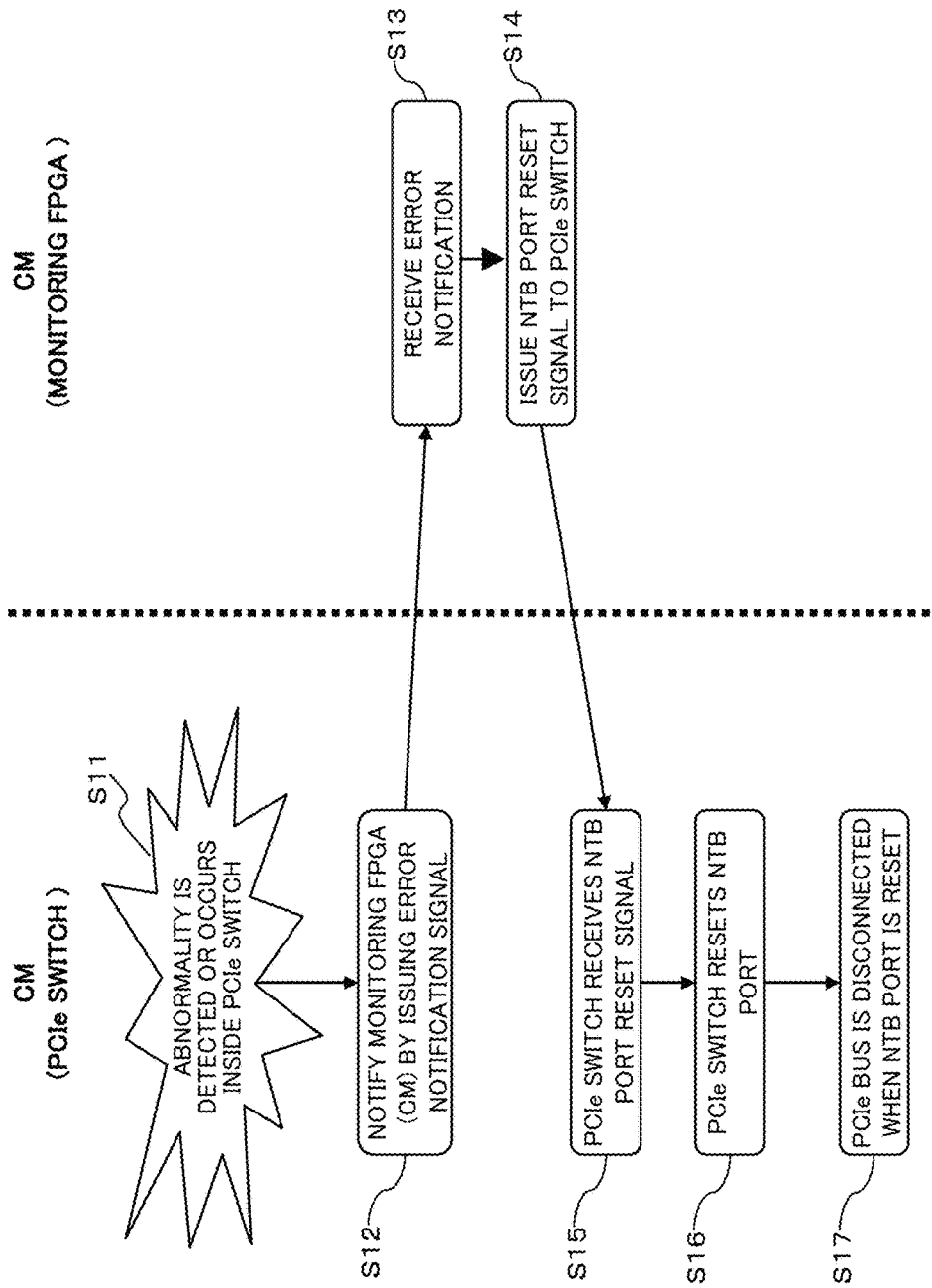
FIG. 4 is a sequence diagram for explaining a process in case where abnormality which causes data garbling is detected in the PCIe switch of a CM in the storage device according to one embodiment.
Figure 5:
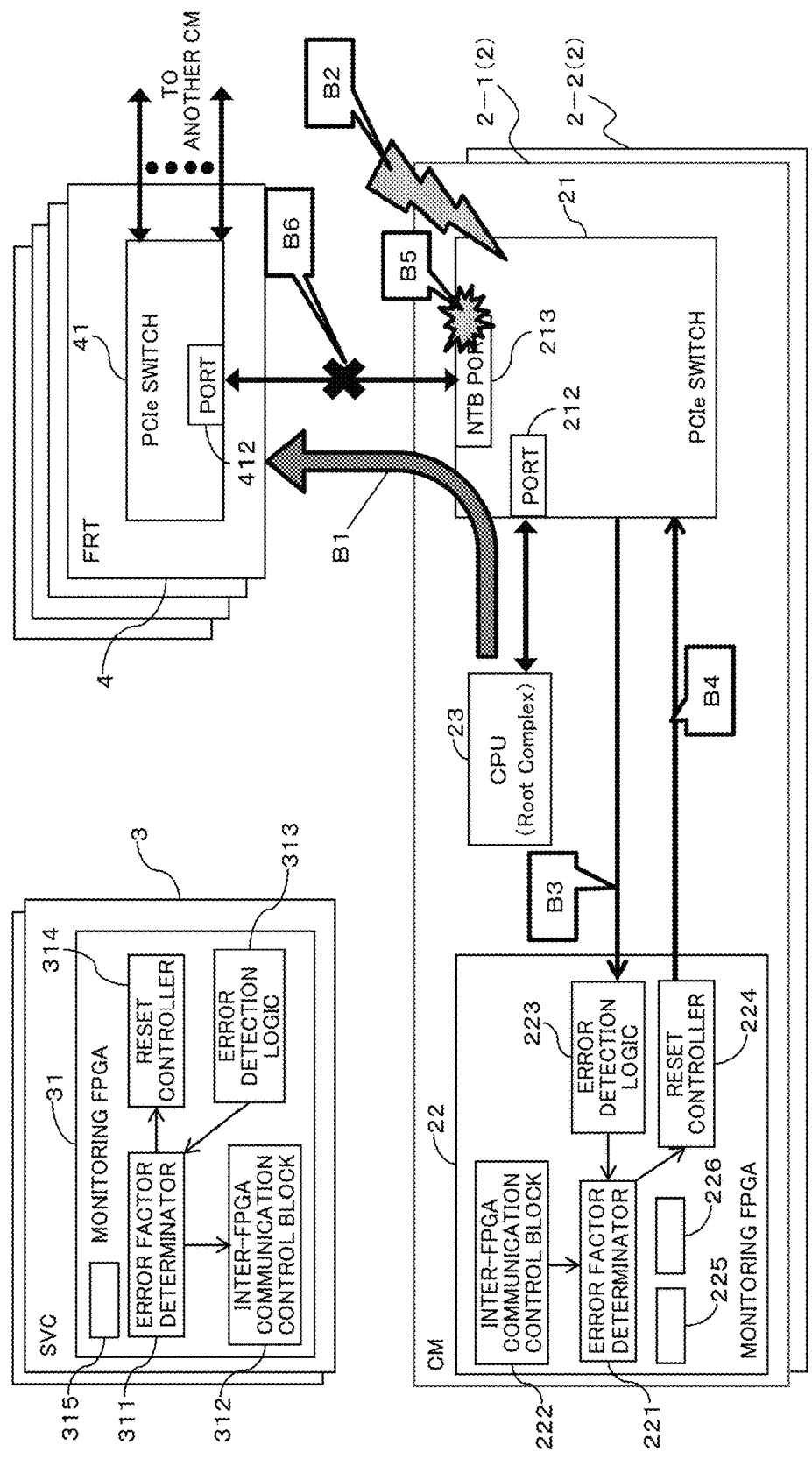
FIG. 5 is a view illustrating a signal flow in case where abnormality which causes data garbling is detected in the PCIe switch of the CM in the storage device according to one embodiment.

In addition, in the sequence diagram illustrated in FIG. 4, steps S11, S12 and S15 to S17 indicate processes in the PCIe switch 21 of the CM 2, and steps S13 and S14 indicate processes in the monitoring FPGA 22 of the CM 2.

In this example, a case where abnormality is detected in a process of transferring data from the CPU 23 (router complex) of the CM 2 to the FRT 4 will be described (see arrow B1 in FIG. 5).

When the CM 2 transfers data to the FRT 4, the first abnormality detector 211 of the PCIe switch 21 detects abnormality which causes data garbling in the PCIe switch 21 (step S11 in FIG. 4 and see reference numeral B2 in FIG. 5).

The first abnormality detector 211 issues an error notification signal to the monitoring FPGA 22 when detecting abnormality (step S12 in FIG. 4 and see reference numeral B3 in FIG. 5), and the error detection logic 223 of the monitoring FPGA 22 receives this error notification signal (step S13 in FIG. 4).

In the monitoring FPGA 22, the error factor determinator 221 refers to the first determining register 225. When "1" is set to the first determining register 225, a following process is performed.

That is, the error factor determinator 221 issues to the reset controller 224 an NTB port reset instruction for resetting the NTB port 213 of the PCIe switch 21.

The reset controller 224 issues the NTB port reset signal to the PCIe switch 21 (step S14 in FIG. 4 and see reference numeral B4 in FIG. 5).

The PCIe switch 21 receives this NTB port reset signal (step S15 in FIG. 4), and resets the NTB port 213 (step S16 in FIG. 4 and see reference numeral B5 in FIG. 5).

When the NTB port 213 is reset, the PCIe bus connection between the PCIe switch 21 and the PCIe switch 41 of the FRT 4 is disconnected (step S17 in FIG. 4 and see reference numeral B6 in FIG. 5). Consequently, it is possible to prevent data garbling (error) which has occurred in the CM 2, from transmitting to the FRT 4.

(b) Detection of Abnormality in FRT 4 (First Error Process Mode)

Next, a process in the first error process mode in case where abnormality which causes data garbling is detected in the PCIe switch 41 of the FRT 4 after data is normally transferred from the data transmission source CM 2 to the FRT 4 will be described according to a sequence diagram illustrated in FIG. 6 (steps S21 to S29) with reference to FIG. 7. FIG. 7 is a view illustrating a signal flow in case where abnormality which causes data garbling is detected in the PCIe switch 41 when data is transferred from the FRT 4 to the CM 2.

Figure 6:
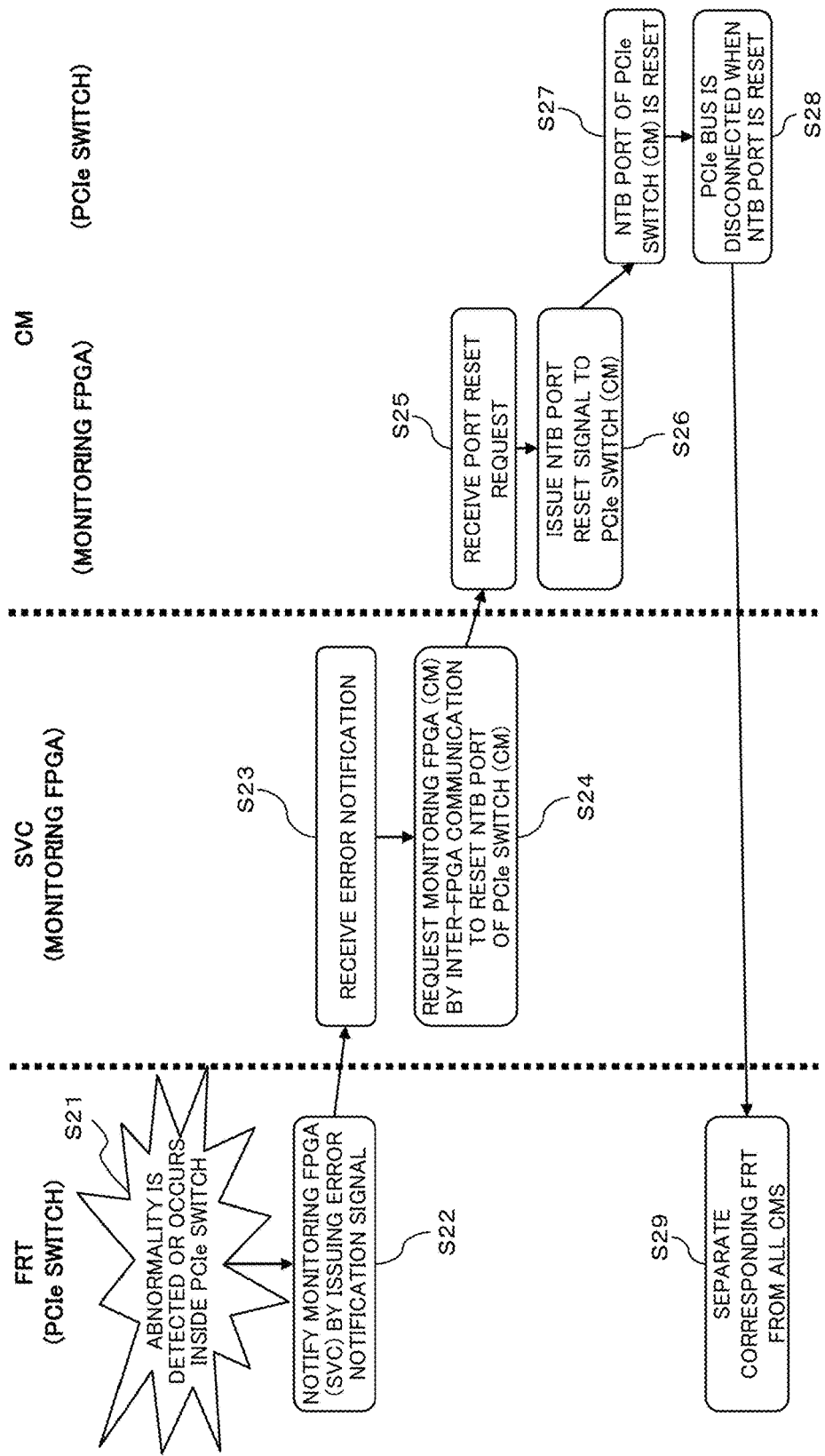
FIG. 6 is a sequence diagram for explaining a process of a first error process mode in case where abnormality which causes data garbling is detected in the PCIe switch of the FRT in the storage device according to one embodiment.
Figure 7:
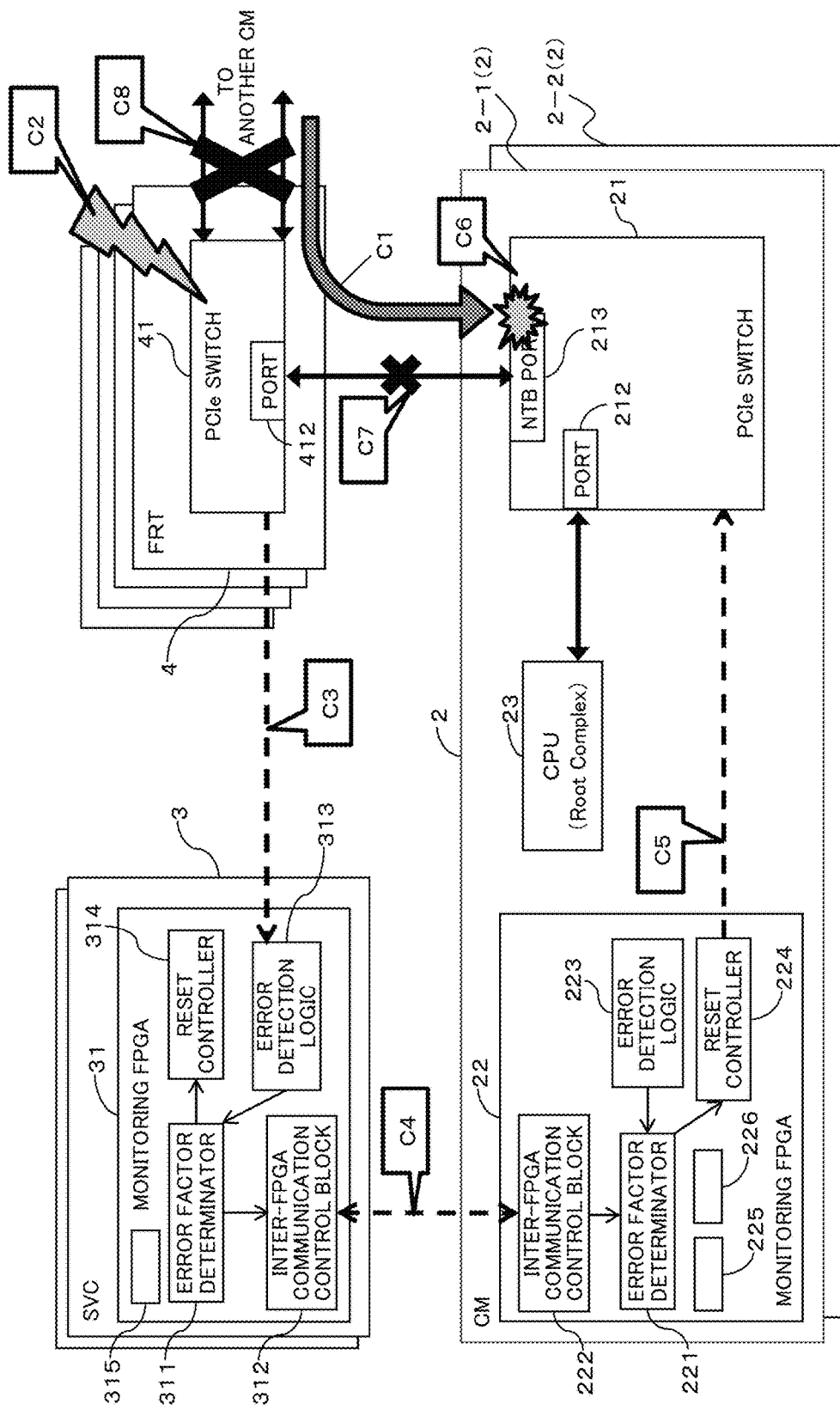
FIG. 7 is a view illustrating a signal flow in case where abnormality which causes data garbling is detected in the PCIe switch of the FRT in the storage device according to the embodiment.

In addition, in the sequence diagram illustrated in FIG. 6, steps S21, S22 and S29 indicate processes in the PCIe switch 41 of the FRT 4, and steps S23 and S24 indicate processes in the monitoring FPGA 31 of the SVC 3. Further, steps S25 and S26 indicate processes in the monitoring FPGA 22 of the CM 2, and steps S27 and S28 indicate processes in the PCIe switch 21 of the CM 2.

In this example, a case where abnormality is detected in a process of transferring data from the FRT 4 to the CM 2 will be described (see arrow C1 in FIG. 7).

When data is transferred from the FRT 4 to the CM 2, the second abnormality detector 411 of a PCIe switch 41 detects abnormality which causes data garbling in the PCIe switch 41 (step S21 in FIG. 6 and see reference numeral C2 in FIG. 7).

The second abnormality detector 411 issues an error notification signal to the monitoring FPGA 31 of the SVC 3 when detecting abnormality (step S22 in FIG. 6 and see reference numeral C3 in FIG. 7). The error detection logic 313 of the monitoring FPGA 31 of the SVC 3 receives this error notification signal (step S23 in FIG. 6).

In the monitoring FPGA 31, the error factor determinator 311 refers to the third determining register 315. When "0" is set to the third determining register 315, the error factor determinator 311 performs the process in the first error process mode. That is, the error factor determinator 311 notifies the monitoring FPGA 22 of each CM 2 of an NTB port reset request for resetting the NTB port 213 of the PCIe switch 21 (step S24 in FIG. 6 and see reference numeral C4 in FIG. 7). This NTB port reset request is transmitted from the inter-FPGA communication control block 312 of the monitoring FPGA 31 to the inter-FPGA communication control block 222 of the monitoring FPGA 22 of the CM 2 by inter-FPGA communication.

In the CM 2, the inter-FPGA communication control block 222 of the monitoring FPGA 22 receives the NTB port reset request (step S25 in FIG. 6).

In the monitoring FPGA 22, the error factor determinator 221 refers to the second determining register 226.

Hereinafter, when "1" is set to the second determining register 226, the following process is performed.

That is, the error factor determinator 221 issues to the reset controller 224 an NTB port reset instruction for resetting the NTB port 213 of the PCIe switch 21.

When receiving the NTB port reset instruction from the error factor determinator 221, the reset controller 224 issue the NTB port reset signal to the PCIe switch 21 (step S26 in FIG. 6 and see reference numeral C5 in FIG. 7).

When receiving the NTB port reset signal, the PCIe switch 21 of the CM 2 resets the NTB port 213 (step S27 in FIG. 6 and see reference numeral C6 in FIG. 7). When the NTB port 213 of the PCIe switch 21 is reset, PCIe bus connection between the PCIe switch 21 and the PCIe switch 41 of the FRT 4 is disconnected (step S28 in FIG. 6 and see reference numeral C7 in FIG. 7). The same process is performed in each CM 2, and all CMs 2 are separated from the FRT 4 (step S29 in FIG. 6). Consequently, it is possible to prevent data garbling (error) which has occurred in the FRT 4, from transmitting to each CM 2 (see reference numeral C8 in FIG. 7).

(c) Detection of Abnormality in FRT 4 (Second Error Process Mode)

Next, the process in the second process mode in case where abnormality which causes data garbling in the PCIe switch 41 of the FRT 4 is detected after data is normally transferred from the data transmission source CM 2 to the FRT 4 will be described according to a sequence diagram illustrated in FIG. 8 (steps S31 to S36) with reference to FIG. 9. FIG. 9 is a view illustrating a signal flow in case where abnormality which causes data garbling in the PCIe switch 41 is detected when data is transferred from the FRT 4 to the CM 2.

Figure 8:
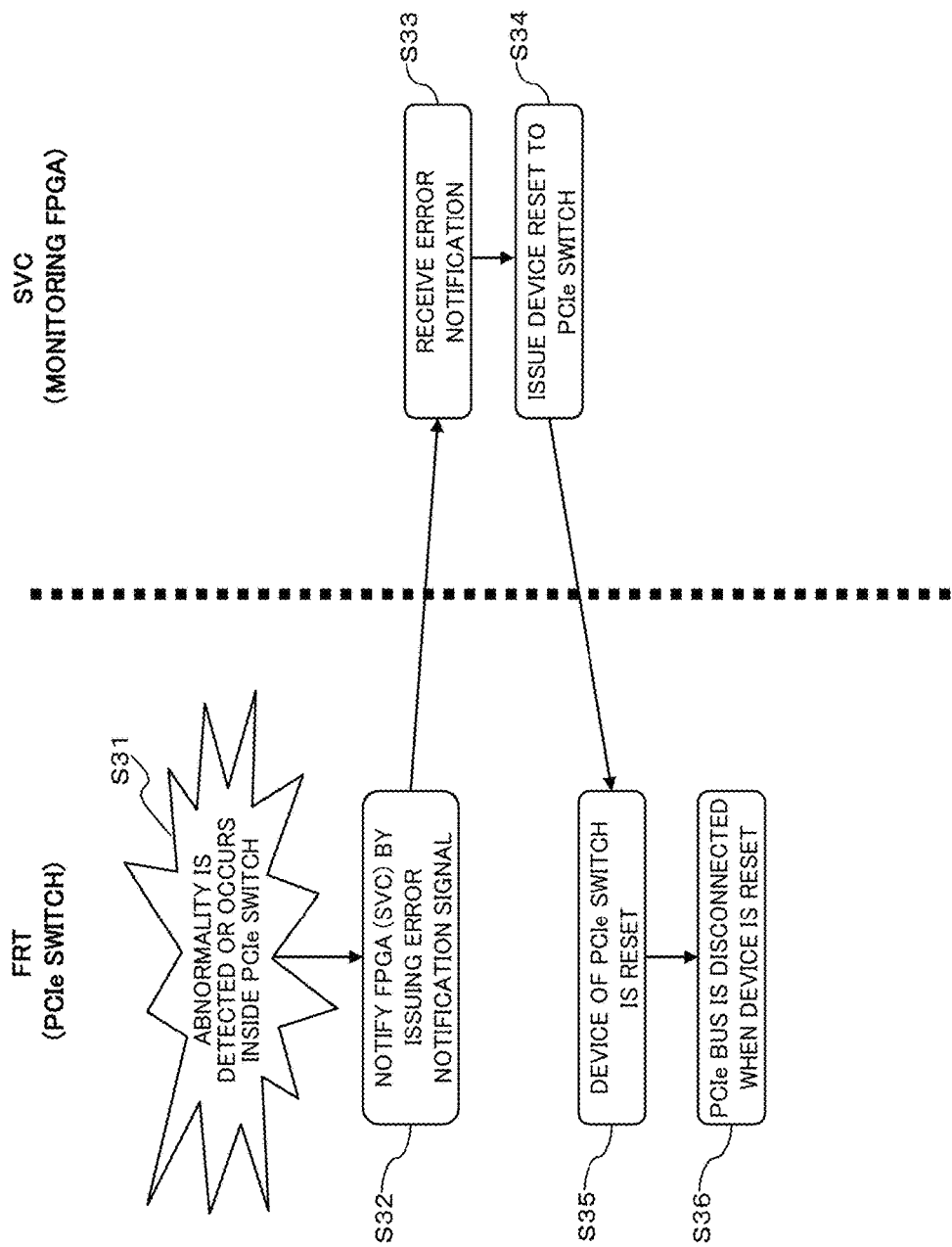
FIG. 8 is a sequence diagram for explaining a process of a second error process mode in case where abnormality which causes data garbling is detected in the PCIe switch of the FRT in the storage device according to one embodiment.
Figure 9:
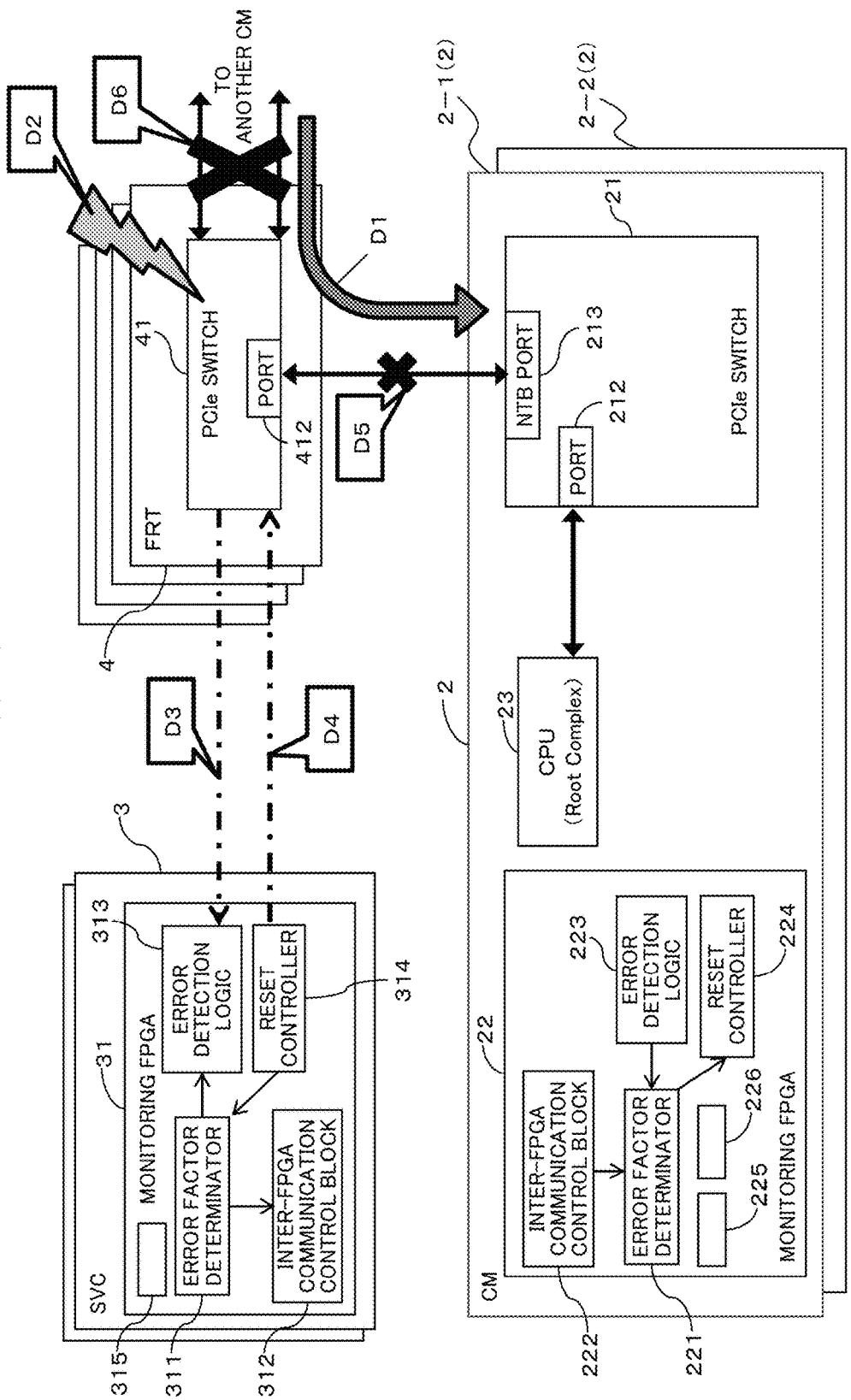
FIG. 9 is a view illustrating a signal flow where abnormality which causes data garbling is detected in the PCIe switch of the FRT in the storage device according to one embodiment.
Figure 10:
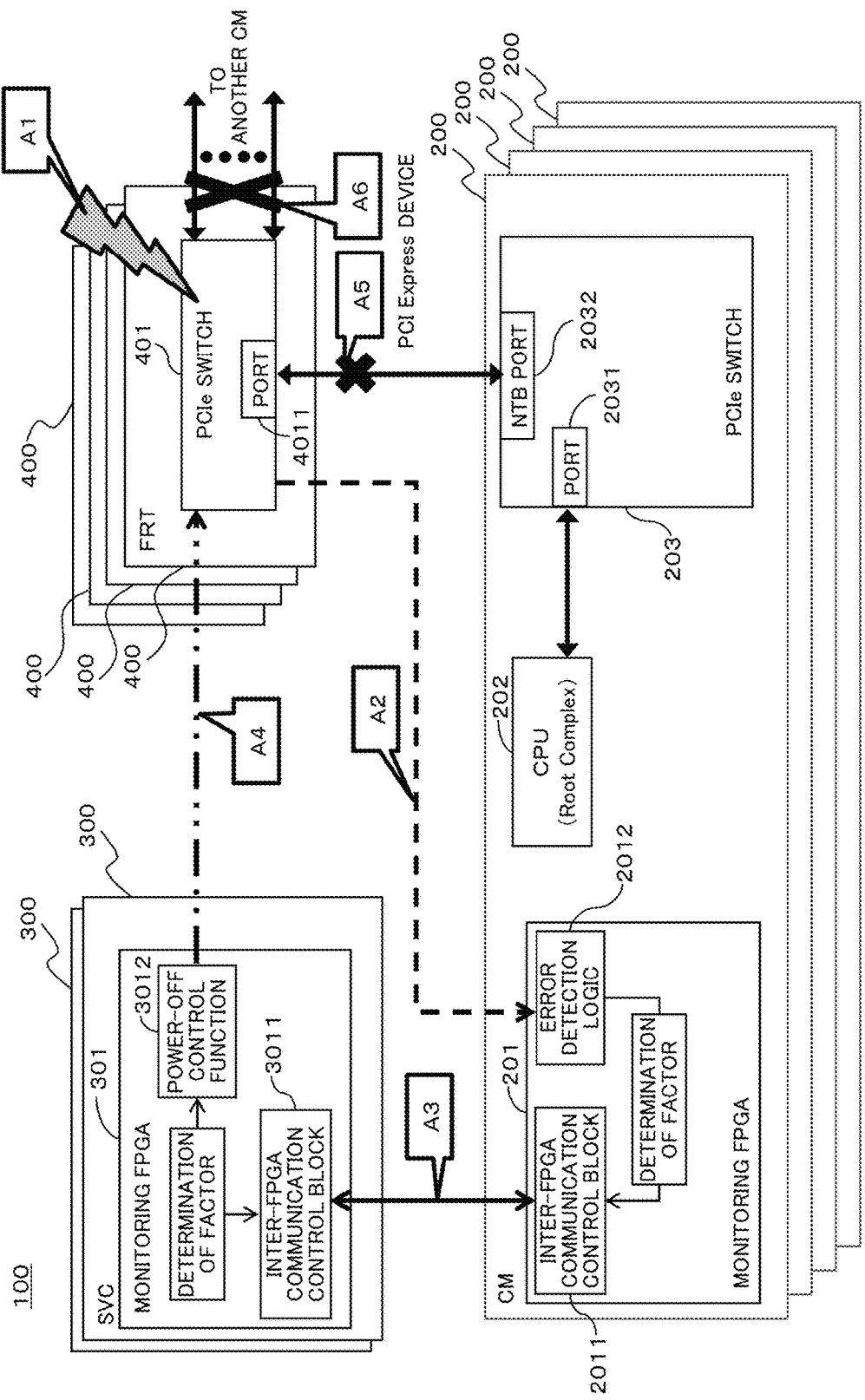
FIG. 10 is a view illustrating a process in case where abnormality is detected in the PCIe switch in a conventional RAID device.

In addition, in the sequence diagram illustrated in FIG. 8, steps S31, S32, S35 and S36 indicate processes in the PCIe switch 41 of the FRT 4, and steps S33 and S34 indicate processes in the monitoring FPGA 31 of the SVC 3.

In this example, a case where abnormality is detected in a process of transferring data from the FRT 4 to the CM 2 will be described (see reference numeral D1 in FIG. 9).

When data is transferred from the FRT 4 to the CM 2, the second abnormality detector 411 of the PCIe switch 41 detects abnormality which causes data garbling in the PCIe switch 41 (step S31 in FIG. 8 and see reference numeral D2 in FIG. 9).

When detecting abnormality, the second abnormality detector 411 issues an error notification signal to the monitoring FPGA 31 of the SVC 3 (step S32 in FIG. 8 and see reference numeral D3 in FIG. 9). The error detection logic 313 of the monitoring FPGA 31 of the SVC 3 receives this error notification signal (step S33 in FIG. 8).

In the monitoring FPGA 31, the error factor determinator 311 refers to the third determining register 315. When "1" is set to the third determining register 315, the error factor determinator 311 performs the process in the second error process mode. That is, the error factor determinator 311 issues to the reset controller 314 a device reset instruction for resetting the PCIe switch 41 of the FRT 4.

The reset controller 314 which has received this device reset instruction issues device reset to the PCIe switch 41 of the FRT 4 (step S34 in FIG. 8 and see reference numeral D4 in FIG. 9).

In the FRT 4, the PCIe switch 41 is subjected to device reset (step S35 in FIG. 8). When the PCIe switch 41 is subjected to device reset, all PCIe buses connected with this FRT 4 are disconnected (step S36 in FIG. 8 and see reference numeral D5 in FIG. 9). Thus, all PCIe buses connected with the FRT 4 for which this device reset has been issued are disconnected. Consequently, it is possible to prevent data garbling (error) which has occurred in the FRT 4, from transmitting to each CM 2 (see reference numeral D6 in FIG. 9).

(C) Effect

Thus, in the storage device 1 according to one embodiment, when the first abnormality detector 211 detects abnormality which causes data garbling in the PCIe switch 21, the PCIe switch 21 of the CM 2 issues an error notification signal to the monitoring FPGA 22.

Further, the reset controller 224 of the monitoring FPGA 22 issues an NTB port reset signal to the PCIe switch 21. When the PCIe switch 21 receives this NTB port reset signal and resets the NTB port 213, PCIe bus connection between the PCIe switch 21 and the PCIe switch 41 of the FRT 4 is disconnected.

Consequently, it is possible to quickly prevent data garbling (error) which has occurred in the CM 2, from transmitting to the FRT 4, and improve reliability.

Further, when abnormality which causes data garbling in the PCIe switch 41 of the FRT 4 is detected after data is normally transferred from the data transmission source CM 2 to the FRT 4, the process in the first error process mode is performed.

In this first error process mode, the second abnormality detector 411 issues an error notification signal to the monitoring FPGA 31 of the SVC 3 when detecting abnormality.

The error factor determinator 311 of the monitoring FPGA 31 notifies the monitoring FPGA 22 of each CM 2 of an NTB port reset request for resetting the NTB port 213 of the PCIe switch 21.

Further, the reset controller 224 of the monitoring FPGA 22 in the CM 2 issues an NTB port reset signal to the PCIe switch 21, and the PCIe switch 21 of the CM 2 resets the NTB port 213. Consequently, PCIe bus connection between the PCIe switch 21 and the PCIe switch 41 of the FRT 4 is disconnected, so that it is possible to prevent data garbling (error) which has occurred in the FRT 4 from transmitting to each CM 2. Consequently, it is possible to improve reliability.

When abnormality which causes data garbling is detected in the PCIe switch 41 of the FRT 4 after data is normally transferred from the data transmission source CM 2 to the FRT 4, the process in the second error process mode is performed.

In this second error process mode, the second abnormality detector 411 issues an error notification signal to the monitoring FPGA 31 of the SVC 3 when detecting abnormality.

Further, the reset controller 314 of the monitoring FPGA 31 issues device reset to the PCIe switch 41 of the FRT 4, so that the PCIe switch 41 of the FRT 4 is subjected to device reset.

Consequently, it is possible to quickly disconnect PCIe bus connection between the PCIe switch 41 of the FRT 4 and each CM 2, and quickly prevent data garbling (error) which has occurred in the FRT 4, from transmitting to each CM 2. Consequently, it is possible to improve reliability.

Further, a setting value indicating in which one of the first error mode and the second error process mode the error factor determinator 311 performs a process is stored in the third determining register 315. Further, the user can flexibly operate a system by changing a value of this third determining register 315 at random.

A setting value indicating whether or not to enable a function of the error factor determinator 221 of issuing an NTB port reset instruction of the NTB port 213 as described above when an error notification signal is received from the PCIe switch 21 is stored in the first determining register 225.

Further, a setting value indicating whether or not to enable a function of the error factor determinator 221 of issuing an NTB port reset instruction of the NTB port 213 as described above when an NTB port reset request for resetting the NTB port 213 of the PCIe switch 21 is received from the monitoring FPGA 31 of the SVC 3 is stored in the second determining register 226.

Furthermore, the user can flexibly operate the system by changing values of these first determining register 225 and the second determining register 226 at random, so that user-friendliness is high.

(D) Others

The disclosed technique is not limited to the above embodiment, and can be variously modified and carried out without departing from the spirit of the present embodiment. Each component and each process according to the present embodiment can be selected if necessary or may be optionally combined.

For example, a configuration of the monitoring FPGA 22 is not limited to this and can be variously modified and carried out. For example, the CPU 23 may realize each function of the monitoring FPGA 22 by executing a program.

Similarly, the CPU may realize each function of the monitoring FPGA 31 by executing a program.

The programs for realizing these functions are provided by being recorded in computer-readable recording media such as flexible disks, CDs (such as CD-ROMs, CD-Rs, and CD-RWs), DVDs (such as DVD-ROMs, DVD-RAMS, DVD-Rs, DVD+Rs, DVD-RWs, DVD+RWs, and HD DVDs), blu-ray disks, magnetic disks, optical disks and magneto-optical disks. Further, a computer reads the programs from these recording media to transfer to and store in an internal storage device or an external storage device. Alternatively, these programs may be recorded in a storage device (recording medium) such as a magnetic disk, an optical disk or a magneto-optical disk and may be provided to the computer via a communication path from this storage device.

Further, a microprocessor (e.g. a MPU (Micro-Processing Unit) or a CPU) realizes each function by executing programs stored in an internal storage device such as a memory. In this case, the program recorded in the recording medium may be read and executed by the computer.

Further, the number of CMs 2 and the number of FRTs 4 provided to the storage device 1 are not limited to the above embodiment, and can be variously modified and carried out.

Furthermore, the number of connectors 25 provided to the CM 2 and the number of connectors 42 provided to the FRT 4 are not limited to the above embodiment likewise, and can be variously modified and carried out.

Still further, an example where the communication cables 8 are PCIe cables, and communication between the CMs 2 and the FRTs 4 is performed by PCIe has been described in the above embodiment. However, the present embodiment is not limited to this and may be applied to standards other than PCIe.

Moreover, an example where communication between the CMs 2 and the FRTs 4 of the storage device 1 is performed has been described in the above embodiment. However, the present embodiment is not limited to this. For example, the present embodiment may be applied to a computer system or the like which connects a plurality of information processing devices, and can be variously modified and carried out.

Further, in the above embodiment, the first error process mode and the second error process mode are alternatively executed based on a value of the third determining register 315. However, the present embodiment is not limited to this, and both of the first error process mode and the second error process mode may be executed.

Further, one of ordinary skill in the art can carry out and manufacture the present embodiment based on the above disclosure.

According to one embodiment, when abnormality is detected in data which is being transferred, it is possible to prevent propagation of this abnormality.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A bus communication system comprising:
a control device that includes a first bus switch;
a communication device that includes a second switch connected with the first bus switch through a first path and is connected with the control device; and
a management device that is connected with the communication device through a second path, that is connected with the control device through a third path, and that manages communication between the control device and the communication device, wherein
the communication device includes an abnormality detector that detects, in the second bus switch, abnormality of data that is being transferred, and transmits an error notification to the management device through the second path,
the management device includes a disconnection request processor that, when receiving the error notification, transmits to the control device a disconnection request for disconnecting the connection with the first bus switch through the third path, and
the control device includes a disconnection processor that disconnects the first path in response to the disconnection request from the disconnection request processor.

2. The bus communication system according to claim 1, wherein
the first bus switch includes a port being able to be individually reset, and the disconnection processor disconnects the connection between the first bus switch and the second bus switch by resetting the port for the first bus switch.

3. The bus communication system according to claim 1, wherein the management device includes a second disconnection processor that, when receiving the error notification, disconnects connection made via the second bus switch by resetting the second bus switch for the communication device.

4. The bus communication system according to claim 1, wherein
the first bus switch includes
a second abnormality detector that detects abnormality of data that is being transferred, and issues an error notification to the management device, and
a third disconnection processor that, when receiving the error notification, disconnects the connection made via the first bus switch.

5. The bus communication system according to claim 4, wherein
the first bus switch includes a port being able to be individually reset, and
the third disconnection processor disconnects the connection made via the first bus switch by resetting the port.

6. The bus communication system according to claim 1, wherein the control device is a storage control device that controls a storage device.

\* \* \* \* \*